(12) United States Patent
Aylesworth

(10) Patent No.: US 8,734,653 B1
(45) Date of Patent: May 27, 2014

(54) MERCURY REMEDIATION METHOD AND APPARATUS

(76) Inventor: Terrence W. Aylesworth, Algonquin, IL (US)

( * ) Notice: Subject to any disclaimer, the term of this patent is extended or adjusted under 35 U.S.C. 154(b) by 435 days.

(21) Appl. No.: 13/373,776

(22) Filed: Nov. 30, 2011

(51) Int. Cl.
| | |
|---|---|
| C02F 9/00 | (2006.01) |
| C02F 1/20 | (2006.01) |
| C02F 1/62 | (2006.01) |
| C02F 1/70 | (2006.01) |
| C02F 1/72 | (2006.01) |
| C02F 1/76 | (2006.01) |
| C02F 1/78 | (2006.01) |
| C02F 5/12 | (2006.01) |

(52) U.S. Cl.
USPC ........... 210/698; 210/709; 210/718; 210/721; 210/739; 210/750; 210/752; 210/754; 210/756; 210/757; 210/758; 210/759; 210/760; 210/914

(58) Field of Classification Search
CPC ............ C02F 1/20; C02F 1/52; C02F 1/5209; C02F 1/5236; C02F 1/5245; C02F 1/5281; C02F 1/62; C02F 1/66; C02F 1/70; C02F 1/705; C02F 1/72; C02F 1/722; C02F 1/727; C02F 1/74; C02F 1/76; C02F 1/766; C02F 1/78; C02F 5/10; C02F 5/12; C02F 5/125; C02F 5/14; C02F 5/145; C02F 9/00; C02F 2101/20; C02F 2103/006; C02F 2103/06; C02F 2103/16; C02F 2103/34; C02F 2103/346; C02F 2103/40; C02F 2209/003; C01G 13/003
USPC ......... 210/696, 698, 709, 718, 721, 739, 750, 210/752, 754, 756, 757, 758, 759, 760, 914
See application file for complete search history.

(56) References Cited

U.S. PATENT DOCUMENTS

| | | | |
|---|---|---|---|
| 4,160,730 | A | 7/1979 | Nguyen |
| 4,599,177 | A | 7/1986 | Hayashi et al. |
| 6,521,131 | B1 | 2/2003 | Hamilton et al. |
| 6,942,840 | B1 | 9/2005 | Broderick |

OTHER PUBLICATIONS

Trasande, L, Landrigan, P.J., Schechter, C., Public Health and Economic Consequences of Methyl Mercury Toxicity to the Dev. Brain, Environ Health Perspectives, Abstract 2005.
U.S.E.P.A., Method1631, Rev E: Mercury in Water by Oxidation, Purge & Trap, and Cold Vapor Atomic Fluorescence Spectrometry, EPA-821-R-02-019, Aug. 2002, pp. iii, 24-27.
Tekran Instrument Company, online fact sheet for the Tekran Series 2600 mercury analyzer, pp. 1-5.

*Primary Examiner* — Lucas Stelling
(74) *Attorney, Agent, or Firm* — Philip H. Kier

(57) ABSTRACT

A mercury remediation method and apparatus for reducing mercury levels in water to a nanogram per liter level that uses four treatment steps: (1) chelation; (2) oxidation; (3) reduction; and (4) air stripping, vapor/liquid separation. There is a fifth step in the process, which does not involve the wastewater. It is to scrub the stripper air of the volatile mercury in an off-gas adsorption unit or to condense volatile mercury in a cryogenic mercury trap.

16 Claims, 1 Drawing Sheet

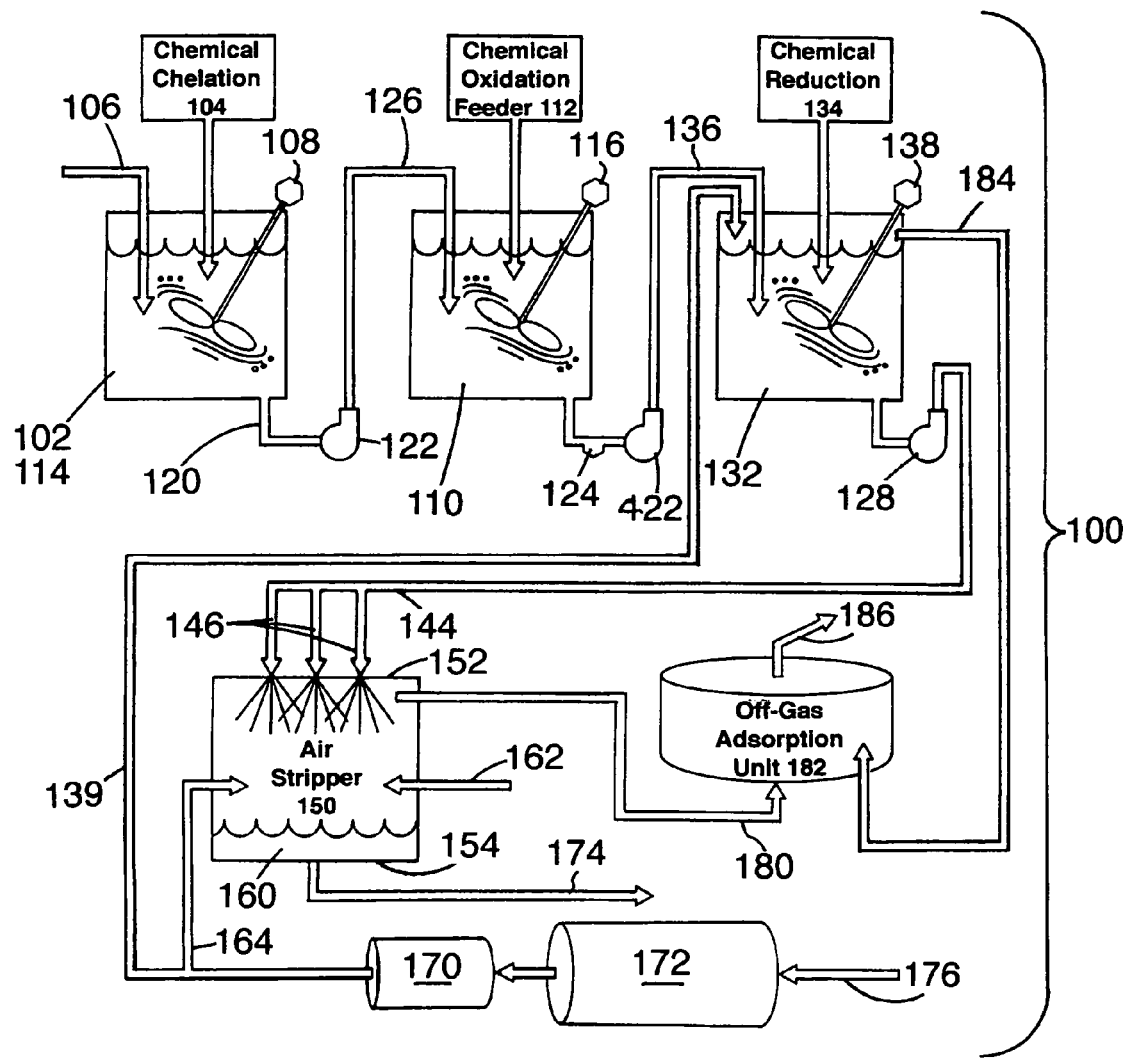

MERCURY REMEDIATION METHOD AND APPARATUS

BACKGROUND OF THE INVENTION

This invention relates to a mercury remediation method and apparatus, and more particularly to a five-step method for reducing mercury levels in water to a nanogram per liter level.

Mercury is a globally ubiquitous, naturally occurring element that is released into the atmosphere as a result of natural events such as volcanic eruptions and forest fires and through human or industrial activities such as the combustion of fossil fuels primarily in electric power production, but also emitted through process operations such as Portland Cement production, municipal and medical solid waste incineration, chloralkali production and mining operations. It is estimated that the proportion of these releases is 30% by natural events, and 70% through human or anthropogenic activities.

Mercury is toxic to humans when it is ingested or inhaled. Methylmercury ($CH_3Hg^+$) is formed when elemental mercury is metabolized in sediment or soils by microbial activity. It is of particular concern because methylmercury tends to accumulate within the food chain, making it a persistent bioaccumulative pollutant. Concentrations of methylmercury in fish can be on the order of a million times the methylmercury concentration in the sediment of the surrounding water. The U.S. EPA and the U.S. Food and Drug Administration (FDA) have issued fish and shellfish consumption advisories particularly aimed at women who might become pregnant, nursing mothers, and young children because of the elevated risks to the child or fetus of neurologic impairment during early development. The Mount Sinai School of Medicine's Center for Children's Health and the Environment published a 2005 report[1] that estimated that the economic consequence of the lost productivity in the U.S. due to methyl mercury toxicity is $8.7 billion per year (in 2000 dollars).

To address these health risks, the U.S. EPA has established the wastewater mercury concentration limit of 1.3 nanograms per liter for wastewater that is discharged into the Great Lakes basin (40 CFR 132.6, Table 4). It has also established the test method used to determine mercury concentration in water, namely, U.S. EPA Method 1631, Revision E: *Mercury in Water by Oxidation, Purge and Trap, and Cold Vapor Atomic Fluorescence Spectrometry.*[2]

Mercury bearing wastewater and air scrubber water will invariably contain particulate material and suspended (undissolved) solids. This presents a significant challenge to the removal of mercury because of the strong attraction mercury has for an undissolved solid particle. Particle-bound mercury is unavailable to react with traditional chemical precipitation technologies such as sodium diethyldithiocarbamate (also called dithiocarbamate, or DTC for short) or to react with precipitation-based, fixed bed adsorption removal systems such as a sorbent trap (for example, a sulfur impregnated activated carbon), or various types of ion exchange resins that are commercially available and marketed for mercury control. These methods rely on mercury physically reacting with the chemical precipitant for the mercury removal. However, if the mercury is bound to a particle, the particle will interfere with the chemical precipitant's ability to physically react with and chemically bond to the mercury, which undermines the strategy of mercury removal methods.

As a result, particle-bound Hg is traditionally removed with physical filter type liquid/solids separation devices such as a sand or anthracite media filter or a membrane filter. The very small mercury-bound particle size coupled with the very low Hg discharge concentration limit requires that extremely fine particle size removal performance be accomplished. This very fine particle size removal performance is most commonly accomplished with costly membrane technologies such as ultrafiltration (with membrane pore sizes ranging from 300 nm to 10,000 nm), nanofiltration (~90 nm-800 nm pore sizes) or hyperfiltration (also called reverse osmosis, or RO, ~0.1-1 nm pore sizes).

These membrane systems are expensive both from a capital and an operational standpoint. The membranes are expensive to buy and have a relatively short life-cycle, requiring continuous membrane element replacement at considerable cost. Membrane systems require a lot of space. The operational costs include significant wastewater (feedwater) pretreatment requirements, off-line membrane cleaning necessities that include equipment and chemicals, and the need to manage the wastewater generated by the membrane system itself (membrane cleaning solution and wash-water). Despite these significant cost requirements, a membrane system still is not designed nor intended to reduce the dissolved Hg concentration.

The membrane-based system must either precede or follow a traditional chemical precipitation type system using dithiocarbamate precipitant or a precipitation-based, fixed bed adsorption removal system that can handle the dissolved Hg. The membrane-based system alone is estimated to be 10 to 40 times more expensive to purchase and operate than for the mercury remediation method and apparatus described in this patent. Add to it the cost of the chemical precipitation system or a mercury-precipitate fixed-bed system, and the membrane remediation approach becomes further cost prohibitive.

Nguyen in U.S. Pat. No. 4,160,730 teaches a method for removing and recovering mercury from aqueous media containing undissolved solids using oxidation, reduction, and aeration. The method is best suited for removing inorganic ionic mercury from chloralkali plant effluent. Hayashi, et al. in U.S. Pat. No. 4,599,177 teach a method for removing mercury, and other heavy metals, from incinerator waste gas by a process that includes washing the waste gas, treating the resulting wastewater with a reducing agent and then subjecting the resulting treated wastewater to stripping treatment in the presence of ferrous ions. Hamilton et al. in U.S. Pat. No. 6,521,131 teaches a method of removing mercury-complexing material from wastewater by strong oxidation followed by mercury-selective absorbent material consisting of a crosslinked styrene-divinylbenzene substrate with dithiocarbamate groups bound thereto. From their tables, their method is capable of reducing the concentration of mercury in contaminated groundwater to the nanogram per liter level, however for wastewater and incinerator scrubber waste only mercury concentrations in the hundreds of nanograms per liter were attained. Broderick in U.S. Pat. No. 6,942,840 describes a method for converting vapor-phase mercury from a gas stream into a liquid in the presence of a precipitant which would then immediately convert the dissolved mercury into a precipitated form.

SUMMARY OF THE INVENTION

The instant invention addresses both dissolved and particle-bound mercury species in wastewater in a process with four treatment steps that are not equipment or energy intensive. This process can be considered a 'polishing step' as it further treats the effluent of a traditional industrial wastewater treatment system. It is designed to reduce the concentration of mercury to below the U.S. EPA's 1.3 nanogram per liter limit, which is an object of the invention.

A continuous flow of industrial wastewater passes through a series of four reaction tanks with each reaction tank providing a different chemical treatment step. These four steps are: (1) chelation; (2) oxidation; (3) reduction; and (4) air stripping, vapor/liquid separation. There is a fifth step in the process, which does not involve the wastewater. It is to scrub the stripper air of the volatile mercury, before the air is released to the atmosphere.

Although both chelation and oxidation are not required to remove mercury from undissolved particles, the use of both processes significantly reduces the overall feed rate of both chelant and/or oxidant. The controlled feed of both chemicals in series (chelant first, followed by oxidant) will perform the desired mercury-particle separation at a reduced individual and combined chemical feed rate. The reason for feeding the chelant, then the oxidant, is that the oxidant helps break the chelant-Hg bond and allows for the Hg to be chemically reduced in the following step, more easily. Thus, another object of the invention is to reduce the amount of chemicals needed to reduce mercury contamination to nanogram/liter levels in water.

The process proposed in this invention does not use expensive membrane filtration technology or chemical treatment processes that require wide pH swings of the wastewater and thereby might require large volumes of reagents and subsequent neutralization of the wastewater before being discharged. Therefore, another object of the invention is to provide an inexpensive process for reducing the concentration of mercury in the wastewater to a nanogram/liter level.

BRIEF DESCRIPTION OF THE DRAWING

FIG. 1 is a flow diagram of the processes that comprise this invention.

DETAILED DESCRIPTION

Since the particular mercury-particle compound to be treated will likely depend on the origin of the wastewater (e.g., a coal powered electric utility air scrubber, an oil refinery wastewater, or a municipal wastewater stream), the optimal chelant and oxidant feed rate will also likely vary with the wastewater origin. Jar tests are performed manually to determine optimal feed rates of chelant and oxidant and these feed rates are controlled with the wastewater treatment automation system, accordingly. The chelant would be base-fed, that is, fed at the rate designated by the volume of wastewater. For example, 1 gallon of reagent would be mixed with 100 gallons wastewater. A method of reagent chemical feed control that is not feed-based, would be by sensor controller. For example, a pH or an Oxidation, Reduction, Potential (ORP) controller would measure the effect of the reagent and control the output of the reagent feed pump in order for the sensor to read a particular value. Chelants are not typically fed this way on an automated basis because there is no cost effective technology available to measure a chelant, or its effect. In contrast to the chelant, the oxidant would be fed based on sensor control, preferably an automated ORP controller.

The first step in the process 100 is to introduce industrial wastewater 106 containing dissolved and particle-bound mercury into a tank 102 into which chemical chelant 104 is also introduced. A mixer 108 mixes the wastewater and the chelant causing mercury to be stripped chemically and removed physically from undissolved particles to which it might be bound. Preferred chelants are: ethylene diamine tetra acetic acid (EDTA), nitrilo triacetic acid (NTA), and diethylene triamine penta acetic acid (DTPA). Other possible chelants include: dimercaprol (BAL); dimercaprol-propane sulfonate (DMPS); ethylenediamine tetraacetic acid (calcium disodium versante) (CaNa$_2$-EDTA); 2,3-dimercaptopropane-sulfonic acid (DMPS); thiamine tetrahydrofururyl disulfide (TTFD); 2,3-dimercaptosuccinic acid (DMSA); dimercaprol (BAL); dimercapto-propane sulfonate (DMPS); ethylenediamine tetraacetic acid (calcium disodium versante) CaNa$_2$-EDTA); 2,3-dimercatopropanesulfonic acid (DMPS); thiamine tetrahydrofurfuryl disulfide; and 2,3-dimercaptosuccinic acid (DMSA).

The next step in the process is for the wastewater to exit the chelation tank through pipe 120 and be pumped by pump 122 through pipe 126 to enter chemical oxidation tank 110 where it is mixed with use of mixer 116 with chemical oxidizing agents 112 that entered the oxidation tank with ORP sensor, oxidant feed rate control. Mercury is further stripped from undissolved particles and chelants by chemical oxidation in this tank. As a result of sufficient oxidation, the dissolved mercury will be in the ionic form (Hg++). Preferred liquid chemical oxidizing agents include bromine monochloride (BrCl) and chlorine dioxide (ClO$_2$). Other suitable oxidizing agents include: sodium hypochlorite (NaOCl; household bleach); magnesium permanganate (Mg(MnO$_4$)$_2$); ozone (O$_3$), chlorine gas (Cl$_2$); and hydrogen peroxide (H$_2$O$_2$).

After the wastewater leaves the oxidation tank, sample tests 124 are performed, either manually or more preferably, by an automated mercury monitor such as with the 2600 Automated Sample Analysis System of the Tekran® Instrument Corporation. U.S. EPA Method 1631 is used to measure total mercury (dissolved and particulate-bound) and filtered mercury (dissolved) in split samples obtained at 124. A very small difference between the total mercury and the filtered mercury indicates that nearly all of the mercury will have been removed from undissolved particles as a result of optimum chelant and oxidant feed rates. This will suggest that the rest of the remediation method will successfully remove the mercury from the wastewater stream. If the total and dissolved mercury test results are considerably different, (for example, more than 1 nanogram per liter) then the feed rates of chelant and oxidant should be re-determined by manual jar testing of untreated wastewater sampled at 106.

If the total and dissolved mercury tests performed suggested that a change to the chelant or oxidant feed rates would need to be made to meet the discharge goal, there would be time and opportunity to make sufficient change to the treatment system. This is because most wastewater discharge permit regulations are upheld on the basis of daily and/or monthly analytical measurement averages.

Pump 422 pumps the wastewater through pipe 136 into chemical reduction tank 132. Also introduced into the chemical reduction tank is a controlled feed of a liquid chemical reducer 134, such as stannous chloride (SnCl) or sodium borohydride (NaBH4) (also known as sodium tetrahydridoborate). The streams are mixed together with mixer 138 so that the oxidized form of mercury, Hg$^{++}$, from the previous step will be converted into the highly volatile form Hg$^0$.

Because of the volatile form of mercury produced, the chemical reduction step should be carried out within a covered tank so that any vapor-phase mercury formed can be contained and vented through pipe 184 to a volatile off-gas adsorption unit 182 to prevent the mercury's release to the atmosphere. To provide an affirmative direction of air flow from the top of the covered reduction tank 132 to the volatile off-gas adsorption unit, an air line 139 goes from an air stripper air compressor 170 to the top of the chemical reduction tank.

Mercury that leaves the chemical reduction tank is in volatile form. The next step in the process is to separate the volatile mercury from the wastewater in an industrial vapor/liquid separation device. A preferred separation device, due to the potentially large industrial volumes, is an air stripper 152. Pump 128 pumps the vapor/liquid mixture leaving the chemical reduction tank 132 through sprayer pipe 144 and nozzles 146 into the air stripper container 150. Air 176 entering the air stripper is first treated in a fixed bed mercury adsorption unit 172 (with for example, sulfur impregnated activated carbon or a commercially available divinylbenzene substrate with a dithiocarbamate treated mercury trap resin) which will remove ambient mercury. The air then enters air stripper compressor 170 before entering the air stripper 152 through air pipe 164. If needed to improve the removal of volatile mercury from the wastewater, steam can be fed to the air stripper through steam pipe 162.

The air stripper has two effluent streams; the vapor stream containing volatile mercury 180 and the liquid stream 174, which consists of wastewater 160 collected at the bottom 154 of the air stripper that meets EPA standards for mercury concentration. The last step in the process is to trap the volatile mercury from the off-gas leaving the air stripper in pipe 180 with an off-gas adsorption unit, 182, (with for example, sulfur impregnated activated carbon or a commercially available divinylbenzene substrate dithiocarbamate fixed bed mercury trap). The air stripper off-gas enters off-gas adsorption unit 182 from the bottom. Volatile mercury is removed from the air and is trapped in the fixed bed mercury trap. Air that is free of mercury is released to the atmosphere 186. When the fixed bed mercury trap becomes exhausted, it is properly disposed of and new mercury trap media is installed.

As in Unit 182, there is a process for removing mercury from the air compressor feeding air to the air stripper. Unit 172 contains a fixed bed mercury adsorption unit consisting of either sulfur impregnated activated carbon, or a divinylbenzene substrate with dithiocarbamate heavy metal precipitant. It removes mercury from the ambient air that feeds the air compressor, 170. If mercury wasn't removed from the air that is fed to the air compressor, the treated wastewater in the air stripper could be re-contaminated with mercury.

As an alternative to the off-gas adsorption unit, a cryogenic mercury trap may be used to condense the volatile mercury into solid, elemental form. The solid form of mercury would represent a much smaller volume and would be in an appropriate form for disposal at a mercury repository, if desired. The U.S. DOE, Office of Environmental Management has considered such a high-security repository and has conducted an Environmental Impact Statement to consider Long-Term Management and Storage of Elemental Mercury. Such a program is still in the proposal stages.

I claim:

1. A method of removing mercury from industrial wastewater containing dissolved and particle-bound mercury comprising:
   introducing wastewater into a chelation tank, introducing a chelant into the chelation tank, mixing the industrial wastewater and the chelant and stripping mercury from undissolved particles from which the mercury was bound;
   introducing wastewater exiting the chelation tank into an oxidation tank, introducing oxidation agents into the oxidation tank, mixing the industrial wastewater and oxidation agents and further stripping mercury from undissolved particles by chemical oxidation;
   sample testing wastewater leaving the chelation tank by measuring total mercury and dissolved mercury and adjusting flow rates of chelants and oxidation agents if there are significant differences between the amount of total mercury and dissolved mercury;
   introducing wastewater that exited the oxidation tank into a covered chemical reduction tank, introducing a reducing agent into the reduction tank, mixing the industrial wastewater and reducing agent, and venting any vapor mercury formed in the oxidation tank to a volatile off-gas adsorption unit; and
   introducing wastewater that exited the reduction tank to an industrial vapor/liquid separation device, directing the separated vapor to the volatile off-gas adsorption unit, and directing the separated liquid to a remediated wastewater exit.

2. The method of removing mercury from industrial wastewater as set forth in claim 1 wherein the flow rates of chelants and oxidation agents are adjusted if the difference in the amount of total mercury and dissolved mercury in the sample testing is greater than 1 nanogram per liter.

3. The method of removing mercury from industrial wastewater as set forth in claim 2 wherein the method of measuring total and dissolved mercury in the wastewater leaving the oxidation tank is U.S. EPA Method 1631.

4. The method of removing mercury from industrial wastewater as set forth in claim 3 wherein the vapor/liquid separation device is an air stripper.

5. The method of removing mercury from industrial wastewater as set forth in claim 4 wherein the chelant is select from the group consisting of ethylene diamine tetra acetic acid (EDTA), nitrilo triacetic acid (NTA), diethylene triamine penta acetic acid (DTPA), dimercaprol (BAL); dimercaprolpropane sulfonate (DMPS); ethylenediamine tetraacetic acid (calcium disodium versante) ($CaNa_2$-EDTA); 2,3-dimercaptopropanesulfonic acid (DMPS); thiamine tetrahydrofururyl disulfide (TTFD); 2,3-dimercaptosuccinic acid (DMSA); dimercaprol (BAL); dimercapto-propane sulfonate (DMPS); ethylenediamine tetraacetic acid (calcium disodium versante) $CaNa_2$-EDTA); 2,3-dimercatopropanesulfonic acid (DMPS); thiamine tetrahydrofurfuryl disulfide; and 2,3-dimercaptosuccinic acid (DMSA).

6. The method of removing mercury from industrial wastewater as set forth in claim 5 wherein the oxidizing agent is selected from the group consisting of bromine monochloride (BrCl), chlorine dioxide ($ClO_2$), sodium hypochlorite (NaOCl), magnesium permanganate ($Mg(MnO_4)_2$); ozone ($O_3$), chlorine gas ($Cl_2$); and hydrogen peroxide ($H_2O_2$).

7. The method of removing mercury from industrial wastewater as set forth in claim 6 wherein the reducing agent is selected from the group consisting of stannous chloride (SnCl) and sodium borohydride (NaBH4).

8. The method of removing mercury from industrial wastewater as set forth in claim 7 wherein the off-gas adsorption unit has a sulfur impregnated activated carbon mercury trap.

9. The method of removing mercury from industrial wastewater as set forth in claim 7 wherein the off-gas adsorption unit has a divinylbenzene substrate dithiocarbonate fixed bed mercury trap.

10. A method of removing mercury from industrial wastewater containing dissolved and particle-bound mercury comprising:
   introducing wastewater into a chelation tank, introducing a chelant into the chelation tank, mixing the industrial wastewater and the chelant and stripping mercury from undissolved particles from which the mercury was bound;
   introducing wastewater exiting the chelation tank into an oxidation tank, introducing oxidation agents into the oxidation tank, mixing the industrial wastewater and oxidation agents and further stripping mercury from undissolved particles by chemical oxidation;

sample testing wastewater leaving the chelation tank by measuring total mercury and dissolved mercury and adjusting flow rates of chelants and oxidation agents if there are significant differences between the amount of total mercury and dissolved mercury;

introducing wastewater that exited the oxidation tank into a covered chemical reduction tank, introducing a reducing agent into the reduction tank, mixing the industrial wastewater and reducing agent, and venting any vapor mercury formed in the oxidation tank to a cryogenic mercury trap and thereby condensing volatile mercury into a solid form; and introducing wastewater that exited the reduction tank to an industrial vapor/liquid separation device, directing the separated vapor to the cryogenic mercury trap, and directing the separated liquid to a remediated wastewater exit.

11. The method of removing mercury from industrial wastewater as set forth in claim 10 wherein the flow rates of chelants and oxidation agents are adjusted if the difference in the amount of total mercury and dissolved mercury in the sample testing is greater than 1 nanogram per liter.

12. The method of removing mercury from industrial wastewater as set forth in claim 11 wherein the method of measuring total and dissolved mercury in the wastewater leaving the oxidation tank is U.S. EPA Method 1631.

13. The method of removing mercury from industrial wastewater as set forth in claim 12 wherein the vapor/liquid separation device is an air stripper.

14. The method of removing mercury from industrial wastewater as set forth in claim 13 wherein the chelant is select from the group consisting of ethylene diamine tetra acetic acid (EDTA), nitrilo triacetic acid (NTA), diethylene triamine penta acetic acid (DTPA), dimercaprol (BAL); dimercaprol-propane sulfonate (DMPS); ethylenediamine tetraacetic acid (calcium disodium versante) ($CaNa_2$-EDTA); 2,3-dimercaptopropanesulfonic acid (DMPS); thiamine tetrahydrofururyl disulfide (TTFD); 2,3-dimercaptosuccinic acid (DMSA); dimercaprol (BAL); dimercapto-propane sulfonate (DMPS); ethylenediamine tetraacetic acid (calcium disodium versante) $CaNa_2$-EDTA); 2,3-dimercatopropanesulfonic acid (DMPS); thiamine tetrahydrofurfuryl disulfide; and 2,3-dimercaptosuccinic acid (DMSA).

15. The method of removing mercury from industrial wastewater as set forth in claim 14 wherein the oxidizing agent is selected from the group consisting of bromine monochloride (BrCl), chlorine dioxide ($ClO_2$), sodium hypochlorite (NaOCl), magnesium permanganate ($Mg(MnO_4)_2$); ozone ($O_3$), chlorine gas ($Cl_2$); and hydrogen peroxide ($H_2O_2$).

16. The method of removing mercury from industrial wastewater as set forth in claim 14 wherein the reducing agent is selected from the group consisting of stannous chloride (SnCl) and sodium borohydride (NaBH4).

* * * * *